United States Patent
Yao (10) Patent No.: US 12,127,149 B2
(45) Date of Patent: Oct. 22, 2024

(54) API DRIVEN SUBSCRIBER IMS REGISTRATION STATUS CHANGES AND IMS ROUTING STEERING

(71) Applicant: AT&T Intellectual Property I, L.P., Atlanta, GA (US)

(72) Inventor: Timothy Yao, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 143 days.

(21) Appl. No.: 17/504,989

(22) Filed: Oct. 19, 2021

(65) Prior Publication Data

US 2023/0117615 A1    Apr. 20, 2023

(51) Int. Cl.
*H04W 60/00*    (2009.01)
*G06F 9/54*    (2006.01)
*H04W 8/04*    (2009.01)

(52) U.S. Cl.
CPC ............ *H04W 60/00* (2013.01); *G06F 9/547* (2013.01); *H04W 8/04* (2013.01)

(58) Field of Classification Search
CPC ......... H04W 60/00; H04W 8/04; H04W 4/12; G06F 9/547; H04L 65/1073; H04L 65/1016; H04L 65/1069
See application file for complete search history.

(56) References Cited

U.S. PATENT DOCUMENTS

| | | | | |
|---|---|---|---|---|
| 9,031,067 B2 * | 5/2015 | Westman | ................ | H04L 67/63 370/389 |
| 9,277,522 B2 * | 3/2016 | Suryavanshi | ....... | H04L 65/1094 |
| 9,413,618 B2 * | 8/2016 | Martinez Perea | ...... | H04L 41/50 |
| 9,854,004 B2 * | 12/2017 | Bharadwaj | .......... | H04L 65/1016 |
| 10,264,413 B1 * | 4/2019 | Bogineni | ................ | H04W 4/12 |
| 10,965,461 B1 * | 3/2021 | Wright | .................. | H04L 9/3239 |
| 11,172,003 B1 * | 11/2021 | Maloney | ............. | H04L 65/1094 |
| 11,539,757 B1 * | 12/2022 | Evans | ..................... | H04L 51/58 |
| 11,546,243 B1 * | 1/2023 | Menon | .................. | H04W 24/06 |
| 2002/0090950 A1 * | 7/2002 | Uskela | ..................... | H04W 8/06 455/445 |
| 2003/0035401 A1 * | 2/2003 | Shaheen | ................. | H04L 65/80 370/468 |
| 2004/0019561 A1 * | 1/2004 | Isturiz | .................. | G06Q 20/102 705/40 |

(Continued)

FOREIGN PATENT DOCUMENTS

| CA | 2847920 A1 * | 6/2009 | ......... H04L 65/1006 |
|---|---|---|---|
| CA | 3042814 C * | 4/2022 | ....... G06F 16/24573 |

(Continued)

OTHER PUBLICATIONS

Lieuwen, D. F., Morgan, T. C., Raether, H. L., Ramamoorthy, S. K., Xiong, M., & Hull, R. B. (2006). Subscriber data management in IMS networks. Bell Labs Technical Journal, 10(4), 197-215. doi:http://dx.doi.org/10.1002/bltj.20134 (Year: 2006).*

(Continued)

*Primary Examiner* — Yuwen Pan
*Assistant Examiner* — Swati Jain
(74) *Attorney, Agent, or Firm* — GUNTIN & GUST, PLC; Mark Wilinski (57) ABSTRACT

A method for discerning single registration subscribers and dual registration subscribers, and routes single registration traffic as internal and routes dual registration traffic as external.

20 Claims, 4 Drawing Sheets

(56) References Cited

U.S. PATENT DOCUMENTS

| | | | |
|---|---|---|---|
| 2005/0286531 A1* | 12/2005 | Tuohino | H04Q 3/66 370/395.2 |
| 2006/0120362 A1* | 6/2006 | Westman | H04L 67/14 370/389 |
| 2006/0229896 A1* | 10/2006 | Rosen | G06Q 10/1053 705/321 |
| 2007/0243870 A1* | 10/2007 | Bantukul | H04L 65/104 455/435.1 |
| 2008/0167961 A1* | 7/2008 | Wentker | G06Q 20/3278 705/14.25 |
| 2009/0238174 A1* | 9/2009 | Veenstra | H04L 65/1016 370/352 |
| 2012/0069776 A1* | 3/2012 | Caldwell | H04W 4/02 370/271 |
| 2012/0158964 A1* | 6/2012 | Van Elburg | H04L 61/30 709/225 |
| 2013/0013735 A1* | 1/2013 | Kim | H04L 65/1073 709/217 |
| 2014/0134978 A1* | 5/2014 | Zitnik | H04L 65/1069 455/411 |
| 2014/0341109 A1* | 11/2014 | Cartmell | H04W 28/0263 370/328 |
| 2014/0355520 A1* | 12/2014 | Wallis | H04L 65/1016 370/328 |
| 2015/0055550 A1* | 2/2015 | Suryavanshi | H04L 65/1104 370/328 |
| 2015/0373199 A1* | 12/2015 | Zitnik | H04L 65/1046 370/260 |
| 2015/0373200 A1* | 12/2015 | Zitnik | H04L 65/40 370/260 |
| 2016/0205519 A1* | 7/2016 | Patel | H04W 4/10 455/518 |
| 2016/0226923 A1* | 8/2016 | Purkop | H04L 65/1063 |
| 2017/0026412 A1* | 1/2017 | Stojanovski | H04W 12/033 |
| 2017/0163645 A1* | 6/2017 | Bradley | G06Q 20/1235 |
| 2017/0295475 A1* | 10/2017 | Patel | H04W 4/10 |
| 2017/0374706 A1* | 12/2017 | Sharma | H04W 76/12 |
| 2018/0019957 A1* | 1/2018 | Synal | H04L 65/1073 |
| 2018/0131806 A1* | 5/2018 | Björsell | H04M 7/0078 |
| 2018/0262613 A1* | 9/2018 | Drake | H04W 4/90 |
| 2018/0295157 A1* | 10/2018 | Marappa Gounder | H04L 65/1046 |
| 2019/0356617 A1* | 11/2019 | Synal | H04L 65/1063 |
| 2020/0344274 A1* | 10/2020 | Jahangir | H04L 65/1016 |
| 2020/0374322 A1* | 11/2020 | Khawaja | H04M 15/66 |
| 2020/0396262 A1* | 12/2020 | Al-Mehdar | H04L 65/00 |
| 2021/0058435 A1* | 2/2021 | Sharma | H04L 65/1069 |
| 2021/0092675 A1* | 3/2021 | Buckley | H04B 1/3816 |
| 2021/0152615 A1* | 5/2021 | Karampatsis | H04W 40/22 |
| 2021/0160761 A1* | 5/2021 | Albasheir | H04W 48/18 |
| 2021/0219131 A1* | 7/2021 | Byadgi | H04L 69/24 |
| 2021/0281614 A1* | 9/2021 | Ahmad | H04L 51/10 |
| 2021/0337384 A1* | 10/2021 | Synal | H04W 12/069 |
| 2022/0046462 A1* | 2/2022 | De Andrade Jardim | H04W 28/02 |
| 2022/0201638 A1* | 6/2022 | Arrobo Vidal | H04W 48/18 |
| 2022/0201639 A1* | 6/2022 | Abtin | H04L 65/1104 |
| 2022/0224728 A1* | 7/2022 | González Sànchez | H04L 63/0442 |
| 2022/0345410 A1* | 10/2022 | Carames | H04L 45/745 |
| 2022/0418011 A1* | 12/2022 | Abdelmalek | H04W 76/20 |
| 2023/0007449 A1* | 1/2023 | Mumick | H04W 4/23 |
| 2023/0086087 A1* | 3/2023 | Shen | H04W 76/12 370/328 |
| 2023/0119045 A1* | 4/2023 | Abdelmalek | H04W 24/10 370/328 |
| 2023/0291773 A1* | 9/2023 | Malhotra | H04L 65/1016 370/259 |

FOREIGN PATENT DOCUMENTS

| | | | | |
|---|---|---|---|---|
| EP | 2648392 A1 | * | 10/2013 | H04L 67/10 |
| WO | WO-2004075507 A2 | * | 9/2004 | H04L 29/12009 |
| WO | WO-2009087271 A1 | * | 7/2009 | H04L 29/12122 |
| WO | WO-2018017321 A1 | * | 1/2018 | H04L 51/04 |
| WO | WO-2021044271 A1 | * | 3/2021 | H04L 65/1016 |

OTHER PUBLICATIONS

Cannell, L. E., Grech, M. L. F., Lee, A. Y., & Unmehopa, M. R. (2003). Service control for next-generation applications in wireless IP multimedia networks. Bell Labs Technical Journal, 8(1), 27-42. Retrieved from https://dialog.proquest.com/professional/docview/661141179?accountid=131444 (Year: 2003).*

Austin, G. P., Doshi, B. T., Hunt, C. J., Nagarajan, R., & Qureshi, M. A. (2001). Service authoring for third-party programmable, service-mediation-enabled feature servers in the multiservice core. Bell Labs Technical Journal, 6(1), 192-210. doi:http://dx.doi.org/10.1002/bltj.2271 (Year: 2001).*

D. F. Lieuwen, T. C. Morgan, H. L. Raether, S. K. Ramamoorthy, M. Xiong and R. B. Hull, "Subscriber data management in IMS networks," in Bell Labs Technical Journal, vol. 10, No. 4, pp. 197-215, Winter 2006, doi: 10.1002/bltj.20134. (Year: 2006).*

* cited by examiner

API DRIVEN SUBSCRIBER IMS REGISTRATION STATUS CHANGES AND IMS ROUTING STEERING

BACKGROUND

Rich Communication Services (RCS) is a communication protocol between mobile telephone carriers and between phone and carrier. RCS may replace short message service messages with a text-message system that provides phonebook polling for service discovery and may transmit in-call multimedia. It is part of broader internet protocol (IP) multimedia subsystem.

This background information is provided to reveal information believed by the applicant to be of possible relevance. No admission is necessarily intended, nor should be construed, that any of the preceding information constitutes prior art.

SUMMARY

A system for discerning single registration subscribers and dual registration subscribers and routing single registration traffic as internal and routes dual registration traffic as external. This enables connectivity to exchange UCE and RCS messaging traffic between mobile network operators and other service providers with RCS messaging hubs.

In an example, an apparatus may include a processor and a memory coupled with the processor that effectuates operations. The operations may include receiving message, wherein the message is application programming (API) call; based on the message, detecting an indication to modify a service order code associated with rich communication services (RCS) messaging; or sending the indication of modification of the service order code to a core device, wherein the service order code indicates single registration for RCS messaging or dual registration for RCS messaging.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

As more and more global mobile network operators (MNO) (also referred herein as wireless service providers) are partnering up with external RCS messaging hubs to act as their messaging core, in which Tier 1 MNOs may have to work with the external RCS messaging hub to maintain IMS registration status for its own subscribers.

Conventionally, the parent network is unaware of the second IMS registration for RCS services at an RCS messaging hub. With this unawareness, the parent network will route RCS traffic as in-network traffic, resulting in session setup failure and missing messages.

When a subscriber that belongs to an MNO who has decided to use a RCS service provided by the external RCS messaging hub versus the service being provided by the MNO itself, the parent network should be informed by the external RCS messaging hub to indicate that a particular subscriber has registered with the external RCS messaging hub for RCS services. In this instance, RCS services are being provided by the external RCS messaging hub. These subscribers are known as dual registrants, as they have IMS-registered within its home MNO network for voice services, while the subscribers also have IMS-registered within the external RCS messaging hub for RCS services. Single registrants are those that have the voice and RCS messaging with the same service provider.

Figure 1:
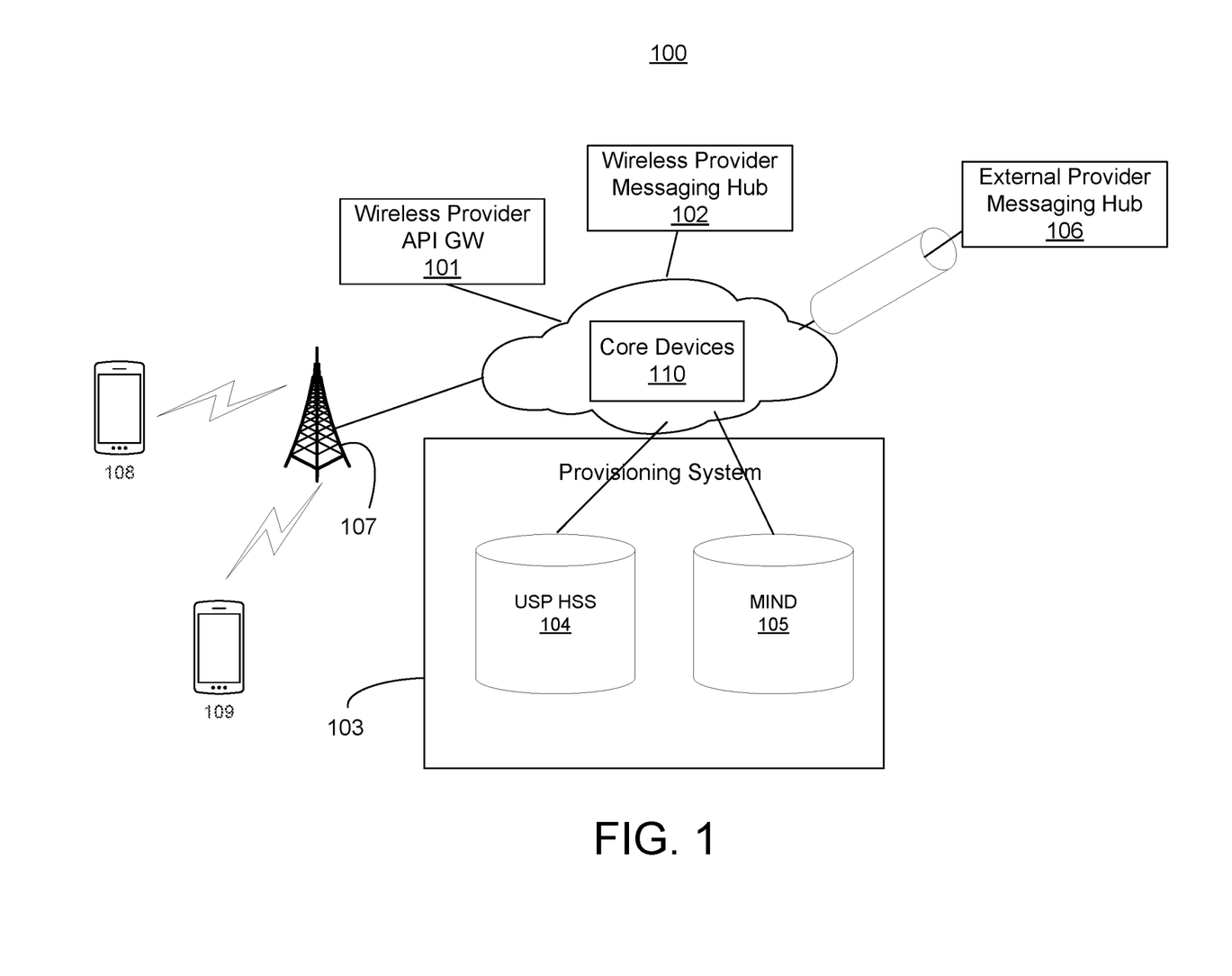
FIG. 1 illustrates an exemplary system for application programming interface (API) driven subscriber internet protocol (IP) multimedia subsystem (IMS) registration status changes or IMS routing steering.

FIG. 1 illustrates an exemplary system for API driven subscriber IP IMS registration status changes or IMS routing steering, among other things. System 100 may include multiple include mobile device 108, mobile device 109, base station 107, wireless provider (WP) API gateway (GW) 101, WP messaging hub 102, core device 110, external provider (EP) messaging hub 106, or provisioning system 103, such as an IP multimedia system (IMS) core home subscriber server (HSS) 104 or MIND 105. The devices of system 100 may be communicatively connected with each other. WP API GW 101, WP messaging hub 102, core devices 110, HSS 104, and MIND 105 may belong to a first service provider (e.g., a wireless service provider). External provider messaging hub 106 may be associated with a second service provider that provides messaging services and is not necessarily a wireless service provider. Core device 110 may include one or more virtual or physical devices (other than the ones shown), such as Call Session Control Function (CSCF), Converged IP Messaging (CPM), E.164 Number Mapping (ENUM), breakout gateway control function (BGCF), virtual Data Border Element (vDBE), or Interoperability Session Boarder Controller (I-SBC), which may help route the RCS messages as disclosed herein. Mobile device 108 and mobile device 109 may attempt to communicate with each other through RCS messaging, in which mobile device 108 and mobile device 109 may be communicating through different wireless service providers.

Figure 2:
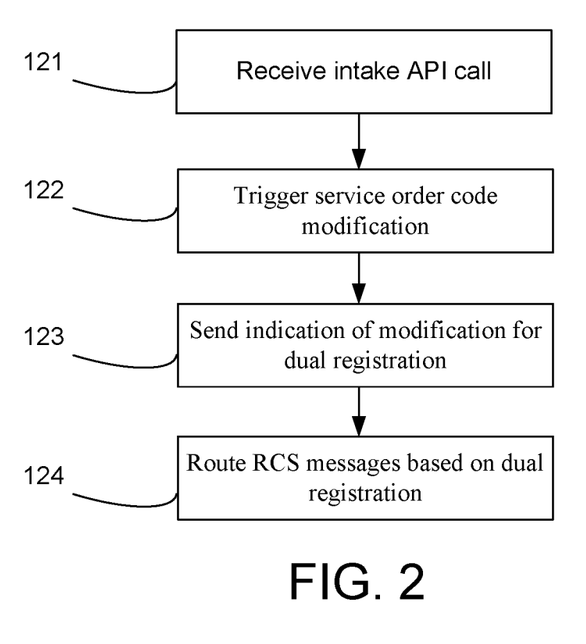
FIG. 2 illustrates an exemplary method for API driven subscriber IP IMS registration status changes or IMS routing steering.

FIG. 2 illustrates an exemplary method for API driven subscriber IP IMS registration status changes or IMS routing steering.

At step 121, receiving, by WP API GW 101, a messagean intake API call. The API call may be from WP messaging hub 102 and may be based on receiving, (from mobile device 108) by WP messaging hub 102, a request to execute RCS messaging. In an example, mobile device 108 may attempt to RCS message mobile device 109, which may be on the same wireless provider network or on different wireless provider networks.

At step 122, the API call of step 121 may trigger the modification of a service order code. In an example, the service order code may be called DualReg. DualReg may be used to indicate whether mobile device 108, for example, is registered to use single registration (e.g., SingleReg) or dual registration (e.g., DualReg) as described herein.

At step 123, sending an indication of a modified service code of step 122 to provisioning system 103. As disclosed herein, provisioning system 103 may include UPS HSS 104, MIND 105, or the like. In an example, UPS HSS 104 may modify an application server index (AsServerNameID) assigned to the "UCE terminating individual subscriber" Initial Filtering Criteria (IFC). The UCE is User Capability Exchange and may be used to understand what the mobile terminated (MT) capabilities are. When adding, AsServerNameID is a BGCF Fully Qualified Domain Name (FQDN), while when removing, AsServerNameID is a Presence application server (AS). "Adding" is when subscriber is switching from Single Registration to Dual Registration. "Removing" is when subscriber is switching from Dual Registration to Single Registration.

With continued reference to step 123, MIND 105 may add or remove DualReg as a value in the "acwipmsgtcos" or the like attribute. The "acwipmsgtcos" is a MIND databased attribute, a Terminating Class of Service attribute. When adding, DualReg as a value is added in the "acwipmsgtcos" attribute. When removing DualReg as a value is removed in the "acwipmsgtcos" attribute.

At step 124, routing RCS messages from mobile device 108 based on the modified service code. The routing is done by one or more of the core devices 110. In an example for dual registration traffic, for outbound UCE Session Initiation Protocol (SIP) traffic, when S-CSCF determines BGCF FQDN as AsServerNameId, S-CSCF routes it as Interop traffic, onto BGCF. Interop traffic is traffic that an MNO needs to route to a partner carrier (foreign traffic, and not native intra traffic). In an example for single registration traffic, when S-CSCF sees Presence AS FQDN as AsServerNameId, S-CSCF routes it as internal traffic, toward Presence AS of the wireless service provider.

With continued reference to step 124, in another example for dual registration traffic, for outbound RCS Messaging SIP traffic, when RCS AS sees DualReg in "acwipmsgtcos" attribute, RCS AS routes traffic as Interop (e.g., external) traffic, onto BGCF. In another example for single registration, when RCS AS does not see DualReg in "acwipmsgtcos" attribute, RCS AS routes traffic in internal traffic, onto terminating S-CSCF.

The disclosed subject matter results in single registration traffic being routed as internal traffic, while dual registration traffic being routed as Interop traffic, toward the external messaging hub.

It is contemplated that service providers may provide different ways for WP messaging hub 102 to be informed of DualReg or SingleReg, such as external messaging hub 106 or another device informing WP messaging hub 102. The method steps herein may be executed on one device or a plurality of devices.

Figure 3:
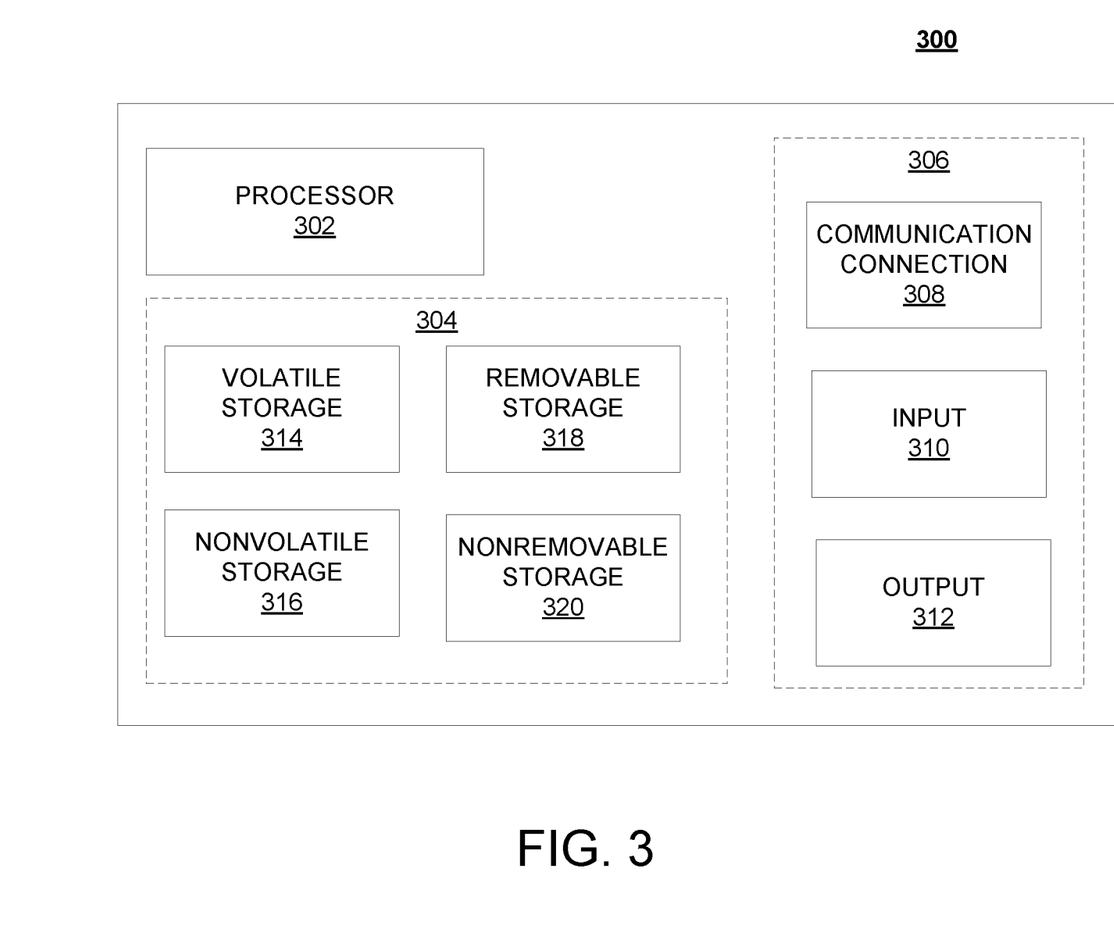
FIG. 3 illustrates a schematic of an exemplary network device.

FIG. 3 is a block diagram of network device 300 that may be connected to or comprise a component of cellular network 112 or wireless network 114. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
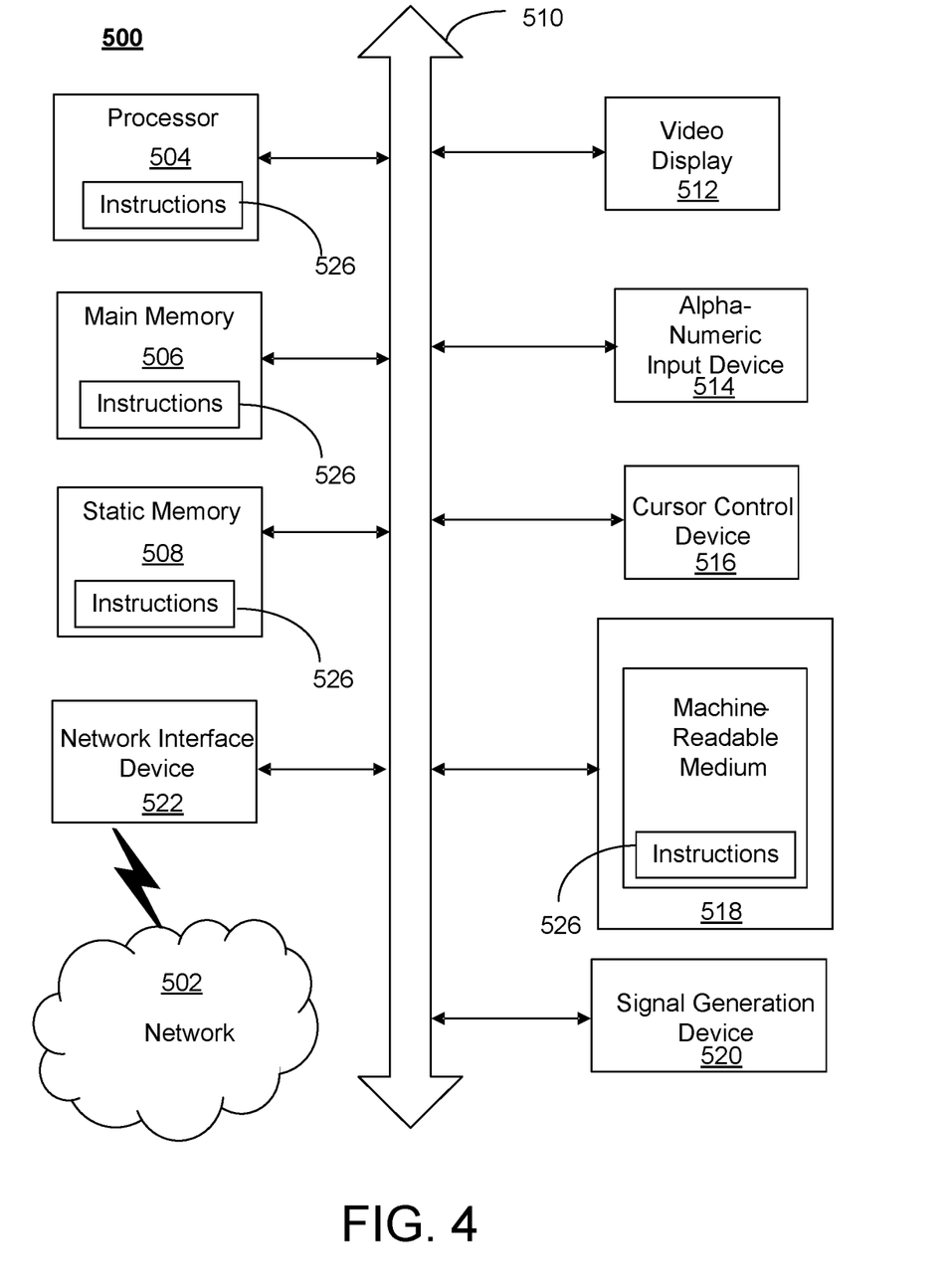
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 108, mobile device 109, base station 107, core device 110, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which API driven subscriber IP IMS registration status changes or IMS routing steering alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—API driven subscriber IP IMS registration status changes or IMS routing steering—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for API driven subscriber IP IMS registration status changes or IMS routing steering. The disclosed subject matter allows for discerning single registration subscribers and dual registration subscribers, and routes single registration traffic as internal and routes dual registration traffic as external. The system allows single registration voice, UCE, and RCS Messaging traffic to route as is, while dual registration voice as in-network traffic and dual registration UCE/RCS messaging traffic as out-of-network traffic. A method, system, computer readable storage medium, or apparatus provides for receiving message, wherein the message is application programming interface (API) call; based on the message, detecting an indication to modify a service order code associated with rich communication services (RCS) messaging; or sending the indication of modification of the service order code to a core device, wherein the service order code indicates single registration for RCS messaging or dual registration for RCS messaging. The core device may be a virtual network function. The subsequent RCS messaging may be routed to an external messaging hub from an internal messaging hub based on the service order code indicating dual registration or single registration. It is contemplated that similar indicators to dual or single may be used and provide the intended functions as disclosed herein. All combinations in this paragraph (including the removal or addition of steps) are contemplated in a manner that is consistent with the other portions of the detailed description.

What is claimed:

1. A method comprising:
   receiving a message, wherein the message is an application programming interface (API) call initiated by a mobile device of a first service provider;
   based on the receiving of the message, detecting an indication to modify a service order code associated with rich communication services (RCS) messaging, the detecting comprising receiving the indication from a messaging hub associated with a second service provider that is different from the first service provider; and
   sending the indication to modify the service order code to a core device, wherein the service order code indicates single registration for RCS messaging or dual registration for RCS messaging, the core device modifying an application server index to a fully qualified domain name when the mobile device is switching from the single registration to the dual registration in accordance with the indication, and the core device modifying the application server index to a presence application server when the mobile device is switching from the dual registration to the single registration in accordance with the indication, wherein the core device routes the message and at least a second message from the mobile device based on at least one virtual device and at least one physical device of the core device in accordance with the modified service order code, and wherein the at least one virtual device and the at least one physical device include: a Call Session Control Function (CSCF), a breakout gateway control function (BCGF), a virtual Data Border Element (vDBE), and an Interoperability Sessions Border Controller (I-SBC).

2. The method of claim 1, further comprising sending routing instructions based on the service order code.

3. The method of claim 1, wherein the RCS messaging is routed to the messaging hub from an internal messaging hub based on the service order code.

4. The method of claim 1, wherein the core device comprises a virtual network function.

5. The method of claim 1, wherein the core device comprises a home subscriber server.

6. The method of claim 1, wherein the second service provider provides messaging services and is not a wireless service provider.

7. An apparatus comprising:
   a processor; and
   memory coupled with the processor, the memory storing executable instructions that when executed by the processor cause the processor to effectuate operations comprising:
      receiving a message, wherein the message is an application programming interface (API) call initiated by a mobile device associated with a first wireless service provider;
      based on the receiving of the message, detecting an indication to modify a service order code associated with rich communication services (RCS) messaging, the detecting comprising receiving the indication from a messaging hub associated with a second service provider that is different from the first wireless service provider; and sending the indication to modify the service order code to a core device, wherein the service order code indicates single registration for RCS messaging or dual registration for RCS messaging, the core device modifying an application server index to a fully qualified domain name when the mobile device is switching from the single registration to the dual registration in accordance with the indication, and the core device modifying the application server index to a presence application server when the mobile device is switching from the dual registration to the single registration in accordance with the indication, wherein the core device routes the message and at least a second message from the mobile device based on at least one virtual device and at least one physical device of the core device in accordance with the modified service order code, and wherein the at least one virtual device and the at least one physical device include: a Call Session Control Function (CSCF), a breakout gateway control function (BCGF), a virtual Data Border Element (vDBE), and an Interoperability Sessions Border Controller (I-SBC).

8. The apparatus of claim 7, the operations further comprising sending routing instructions based on the service order code.

9. The apparatus of claim 7, wherein the RCS messaging is routed to the messaging hub from an internal messaging hub based on the service order code.

10. The apparatus of claim 7, wherein the core device comprises a virtual network function.

11. The apparatus of claim 7, wherein the core device comprises a home subscriber server.

12. The apparatus of claim 7, wherein the second service provider provides messaging services and is not a wireless service provider.

13. A computer readable storage medium storing computer executable instructions that when executed by a computing device cause said computing device to effectuate operations comprising:

receiving a message, wherein the message is an application programming interface (API) call initiated by a mobile device associated with a first wireless service provider;

based on the receiving of the message, detecting an indication to modify a service order code associated with rich communication services (RCS) messaging, the detecting comprising receiving the indication from a messaging hub associated with a second service provider that is different from the first wireless service provider; and sending the indication to modify the service order code to a core device, wherein the service order code indicates single registration for RCS messaging or dual registration for RCS messaging, the core device modifying an application server index to a fully qualified domain name when the mobile device is switching from the single registration to the dual registration in accordance with the indication, and the core device modifying the application server index to a presence application server when the mobile device is switching from the dual registration to the single registration in accordance with the indication, wherein the core device routes the message and at least a second message from the mobile device based on at least one virtual device and at least one physical device of the core device in accordance with the modified service order code, and wherein the at least one virtual device and the at least one physical device include: a Call Session Control Function (CSCF), a breakout gateway control function (BCGF), a virtual Data Border Element (vDBE), and an Interoperability Sessions Border Controller (I-SBC).

14. The computer readable storage medium of claim 13, the operations further comprising sending routing instructions based on the service order code.

15. The computer readable storage medium of claim 13, wherein the RCS messaging is routed to the messaging hub from an internal messaging hub based on the service order code.

16. The computer readable storage medium of claim 13, wherein the core device comprises a virtual network function.

17. The computer readable storage medium of claim 13, wherein the API call is initiated by the mobile device based on the mobile device attempting to RCS message a second mobile device.

18. The computer readable storage medium of claim 17, wherein the fully qualified domain name is a BCGF fully qualified domain name, and wherein the mobile device and the second mobile device are on a same wireless provider network.

19. The computer readable storage medium of claim 17, wherein the mobile device and the second mobile device communicate through different wireless service providers.

20. The computer readable storage medium of claim 13, wherein the second service provider provides messaging services and is not a wireless service provider.

* * * * *

UNITED STATES PATENT AND TRADEMARK OFFICE
CERTIFICATE OF CORRECTION

| | | |
|---|---|---|
| PATENT NO. | : 12,127,149 B2 | Page 1 of 1 |
| APPLICATION NO. | : 17/504989 | |
| DATED | : October 22, 2024 | |
| INVENTOR(S) | : Yao | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this
Eighteenth Day of March, 2025

Coke Morgan Stewart
*Acting Director of the United States Patent and Trademark Office*